United States Patent
Leleve et al.

(10) Patent No.: US 7,864,981 B2
(45) Date of Patent: Jan. 4, 2011

(54) METHOD FOR ADJUSTING THE ORIENTATION OF A CAMERA INSTALLED IN A VEHICLE AND SYSTEM FOR CARRYING OUT THIS METHOD

(75) Inventors: Joël Leleve, Epinay sur Seine (FR); Julien Rebut, Paris (FR)

(73) Assignee: Valeo Vision, Bobigny (FR)

( * ) Notice: Subject to any disclaimer, the term of this patent is extended or adjusted under 35 U.S.C. 154(b) by 1014 days.

(21) Appl. No.: 11/624,234

(22) Filed: Jan. 18, 2007

(65) Prior Publication Data

US 2007/0165909 A1   Jul. 19, 2007

(30) Foreign Application Priority Data

Jan. 19, 2006   (FR) .................................. 06 00497

(51) Int. Cl.
*G06K 9/00*   (2006.01)
(52) U.S. Cl. ...................... 382/104; 382/287; 348/118; 348/211.8; 348/333.04; 348/333.06
(58) Field of Classification Search ................. 382/100, 382/104, 287; 348/118, 211.8, 333.04, 333.06
See application file for complete search history.

(56) References Cited

U.S. PATENT DOCUMENTS

| | | | | |
|---|---|---|---|---|
| 4,970,653 A | * | 11/1990 | Kenue | 701/301 |
| 5,359,666 A | * | 10/1994 | Nakayama et al. | 382/104 |
| 6,990,397 B2 | | 1/2006 | Albou et al. | |
| 2004/0167697 A1 | | 8/2004 | Albou et al. | |
| 2007/0005293 A1 | * | 1/2007 | Maeda et al. | 702/152 |

FOREIGN PATENT DOCUMENTS

| | | |
|---|---|---|
| DE | 10115043 | 4/2002 |
| DE | 10237554 | 3/2004 |
| EP | 1681577 | 7/2006 |
| FR | 2848161 | 6/2004 |
| JP | 2003329411 | 11/2003 |
| JP | 2004247979 | 9/2004 |

* cited by examiner

*Primary Examiner*—John B Strege
(74) *Attorney, Agent, or Firm*—Jacox, Meckstroth & Jenkins

(57) ABSTRACT

A method for adjusting an orientation of a camera installed on a vehicle, comprising the following operations: installing the vehicle at a location provided with markings on the ground, detecting these markings, estimating a vanishing point based on these markings, and matching the vanishing point with a positioning point by angular displacement of the camera.

21 Claims, 2 Drawing Sheets

Figure 1A:
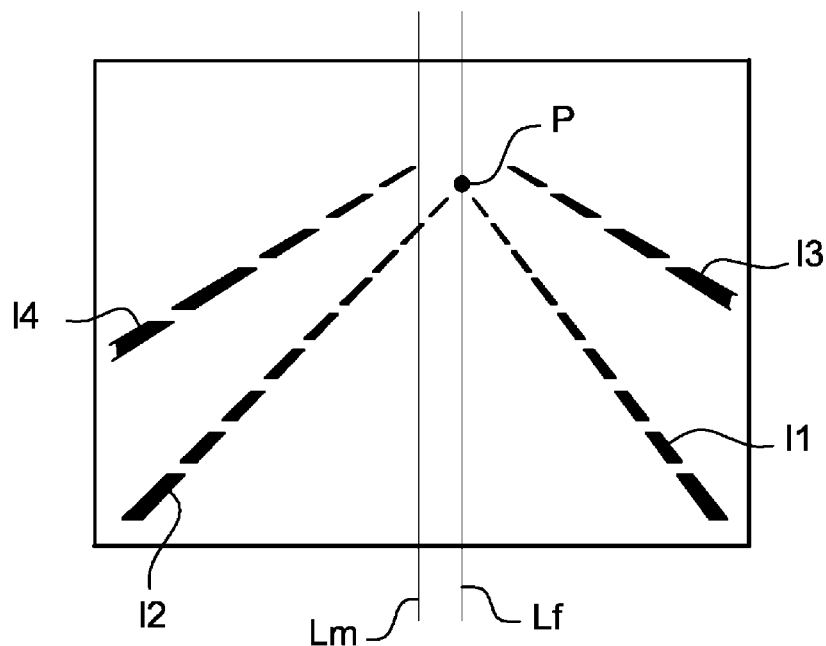

METHOD FOR ADJUSTING THE ORIENTATION OF A CAMERA INSTALLED IN A VEHICLE AND SYSTEM FOR CARRYING OUT THIS METHOD

BACKGROUND OF THE INVENTION

1. Field of the Invention

The invention relates to a system and method for the adjusting, by a user, of the orientation of a camera installed in a vehicle. The user is an individual with little experience in the adjusting of cameras, for example the driver of the vehicle in which the camera to be adjusted is installed. The method of the invention is intended to allow the installation in a vehicle, by an individual, of a system for detecting obstacles or for monitoring white lines.

The invention also relates to a system for carrying out this method.

2. Description of the Related Art

The invention is used in the field of motor vehicles and, in particular, in the field of vehicle after-sales service for installing systems using a camera in a vehicle.

In the field of motor vehicles, numerous systems are installed on the vehicles for increasing the safety of persons on board the vehicle by facilitating driving of the vehicle. Among these systems devoted to vehicle safety, there are systems allowing the detection of obstacles on the road and systems allowing the monitoring of white lines on the ground.

An obstacle detection system detects an obstacle, a pedestrian or another vehicle in a road scene situated before the vehicle equipped with this system. The purpose of a system of this type is to supplement the driver's view of the road scene by displaying, on a screen, the vehicles, pedestrians and other obstacles detected in the road scene.

A system for monitoring white lines detects the parallel markings on the ground, generally referred to as white lines. A system of this type for monitoring white lines allows the detection both of continuous lines and of discontinuous lines or emergency stopping strips on a road. If a vehicle equipped with a system of this type crosses one of the detected white lines, without having previously indicated its intention to cross this line using flashing lights, a warning signal is emitted for the benefit of the driver. This warning signal may be a sound signal ringing in the vehicle, or any other perceptible signal, advising the driver that he has crossed a white line. A system of this type increases driver vigilance, in particular when driving at night-time.

Generally, systems for detecting obstacles or monitoring white lines comprise a camera installed in the vehicle. This camera takes images of the road scene situated before the vehicle. In the case of an obstacle detection system, the camera is associated with a control unit, such as a processor, which processes the image in order to detect, on this image, the presence or absence of an obstacle. In the case of a system for monitoring white lines, the camera is associated with a control unit, such as a processor, which processes the image in order to determine the position of the vehicle relative to the white lines detected on the image.

In most vehicles, the camera is installed behind the windscreen, under the central rear-view mirror. It is therefore positioned between the windscreen and the central rear-view mirror so as not to restrict the driver's view. Positioned in this way, the camera is approximately centered in the vehicle.

In the case of an obstacle detection system, the control unit may be associated with a display screen situated inside the vehicle. This display screen displays a processed image of the road scene situated before the vehicle, improving the driver's view of said road scene. This display screen affords the driver, in particular at night-time or during bad weather, a more precise view of the road scene, thus enabling him to perceive more effectively any obstacle located on the road.

In the case of a system for monitoring white lines, the system is not necessarily associated with a display screen: the driver may view the white line directly through the windscreen. The driver may be merely advised of the crossing of the white line by a sound or visual signal.

Regardless of whether the system is an obstacle detection system or a system for monitoring white lines, the camera taking images of the road scene must be suitably oriented in order to allow correct detection of the element sought in the road setting: misorientation of the camera could lead to the detection of an obstacle or a white line on a different lane of the road to that on which the vehicle is driving, thus affecting the driver's driving. For the monitoring of white lines, in particular, the camera must be oriented in such a way that the element is detected symmetrically so that the signal indicating that the driver is leaving his lane is perceived by the driver to be identical for the left-hand lane and the right-hand lane.

Currently, these obstacle detection systems and systems for monitoring white lines are generally mounted in series on the vehicles. These systems are therefore installed on vehicles directly in car manufacturers' assembly lines. The orientation of the camera is therefore optimally adjusted, by the manufacturer, using a specific adjustment module allowing optimum parameterization of the detection software and optimum adjustment.

The on-site adjustment of the camera means that an individual has to decide when purchasing his vehicle whether he wishes to have one of these systems installed. He can therefore install one of the systems only on a new vehicle.

Moreover, when a vehicle has been damaged and the system misaligned, it is necessary to re-adjust the orientation of the camera. However, unless he has a specific adjustment module, which are too expensive for most motor vehicle repairers and require specific skills, the vehicle repairer cannot carry out this adjustment.

Similarly, an individual wishing to install a kit for monitoring white lines or detecting obstacles bought after-sales could not adjust the camera. To date, this type of system has accordingly not been offered for sale to individuals.

There is, therefore, a need to provide an improved system and method for adjusting a position of a camera on a vehicle.

SUMMARY OF THE INVENTION

One object of the invention is specifically to solve the drawbacks of the technologies set out hereinbefore. For this purpose, the invention proposes a method for allowing a driver or any other individual to adjust the orientation of a camera installed behind the windscreen of a vehicle. In order to do this, the invention proposes to search, in an image produced by the camera, for a horizon line and to seek to align this horizon line with a predetermined line corresponding to the middle of the image.

More specifically, the invention relates to a method for adjusting the orientation of a camera installed on board a vehicle, that includes the following operations:
installing the vehicle at a location provided with parallel markings on the ground,
detecting these markings,
estimating a vanishing point based on these markings,
estimating, on the image, a middle in a substantially vertical plane of said image, matching the vanishing point with the positioning point by angular displacement of the camera.

The method according to the invention may comprise one or more of the following features:

the vanishing point is a point of convergence of the parallel markings on the image;

the estimating of the vanishing point comprises determining the location of the point of convergence and tracing a vanishing line passing through this point of convergence;

the estimating of the middle of the image may include an operation of tracing a middle line passing through the middle in a substantially vertical plane of the image. Alternatively, use may be made of a template or a pattern, in particular a transparent template/pattern, positioned on the display screen comprising the middle marker in a vertical plane and positioning marker in a horizontal plane;

the lines passing through the point of convergence and the middle of the image are substantially vertical;

the lines passing through the point of convergence and the positioning point are substantially horizontal;

the camera is displaced as a function of displacement information deduced from the position of the vanishing point relative to the middle of the image in a vertical plane and from the vertical position of the positioning point.

The invention also relates to a system for adjusting the orientation of a camera which carries out the method described hereinbefore. This system comprises:

a camera capable of producing at least an image of parallel markings on the ground, a processing unit capable of detecting the markings on the image, of estimating a vanishing point and of estimating the positioning point (Q), a user interface capable of providing the user with information on the displacement of the camera.

This system of the invention may comprise one or more of the following features:

the interface comprises a screen displaying the image produced by the camera and also the vanishing and middle lines of the image;

the interface comprises a visual signalling device;

the visual signalling device comprises light-emitting diodes signalling a direction of displacement;

the interface comprises a sound signalling device.

The invention also relates to a vehicle equipped with the system described herein before.

These and other objects and advantages of the invention will be apparent from the following description, the accompanying drawings and the appended claims.

BRIEF DESCRIPTION OF THE ACCOMPANYING DRAWINGS

Figure 1B:
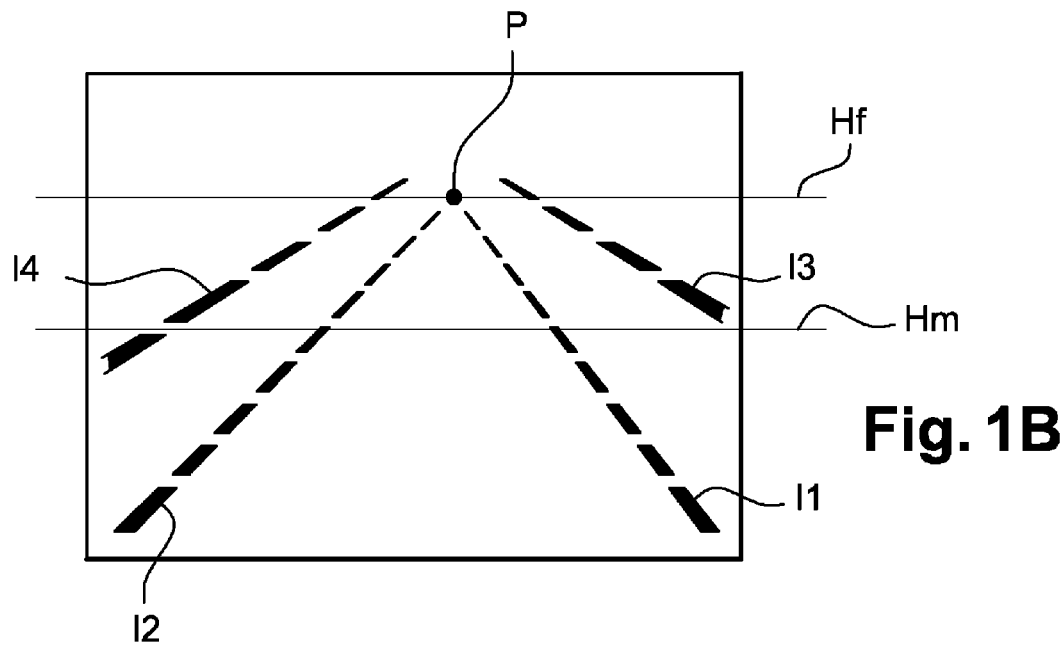
Figure 2:
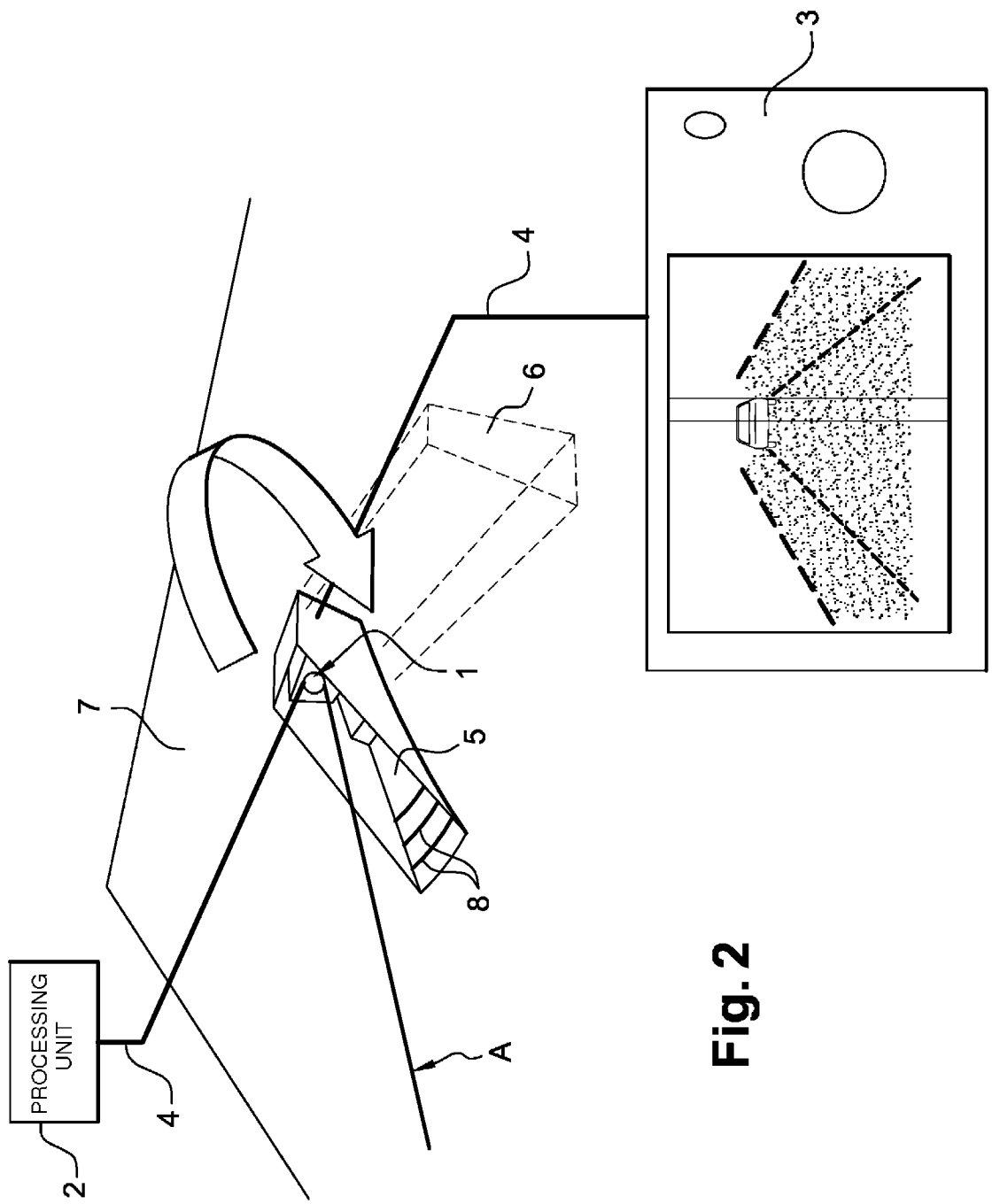

FIGS. 1A and 1B show examples of images of a road scene obtained using the method of the invention, in the case of a horizontal adjustment and of an inclined adjustment of a camera respectively; and FIG. 2 shows an example of a vehicle windscreen equipped with a system for adjusting a camera according to the invention.

DETAILED DESCRIPTION OF THE PREFERRED EMBODIMENTS

The invention proposes a method for adjusting the orientation of a camera on board a vehicle in order optimally to carry out a method using this camera. A method using a camera of this type may be, for example, an obstacle detection method. It may also be a method for detecting parallel markings on the ground. The invention will be described specifically for this application for the detection of markings on the ground, referred to hereinafter as white lines. These white lines may be continuous or discontinuous lines or emergency stopping strips.

The method of the invention is based on the estimation of a vanishing point based on the image of these white lines and on the estimation of a middle in a vertical plane of the image, wherein the middle of the image and the vanishing point have to be superimposed in order for the horizontal orientation of the camera to be optimal. The vertical orientation is produced by matching the vanishing point and the positioning point.

The method of the invention may be carried out when the vehicle on board which the camera is installed is positioned at a location provided with white lines on the ground. This location may be, for example, a car park or else a lane prohibited to traffic, or any other site equipped with parallel white lines, on the ground, where a vehicle may park without disturbing traffic. The vehicle must be positioned between two white lines, at an equal lateral distance from the two lines.

When the vehicle is correctly installed or situated relative to the mounting or lines, the camera takes at least an image of the road scene situated before the vehicle. In view of the positioning of the vehicle, the image of this road scene comprises the white lines on the ground.

The method of the invention then consists in detecting, on the image, the white lines and in estimating a vanishing point, based on these white lines. The vanishing point is located on the horizon line of the image. This vanishing line corresponds to the point of convergence of the white lines on the image. It is determined mathematically, for example, using the Hough transform. When the vanishing point is determined on the image, the method of the invention proposes to match it with the positioning point. The tracing of a vertical line can contribute to a simpler and more readily understandable adjustment. This line is referred to as the vanishing line. As will be seen in greater detail hereinafter, this vanishing line may be vertical or horizontal, but the vanishing point and the positioning point will preferably be matched on this vertical.

The method of the invention then comprises estimating the middle of the image. The middle of the image is a vertical line passing through the center of the image and separating the image into two substantially equal portions.

The method is carried out by an operation performed by the user, for example the driver of the vehicle. This operation consists in angularly displacing the angle of vision of the camera, i.e., in displacing the orientation of the camera so that the vanishing line coincides with the middle of the image. When the vanishing line is merged with the middle of the image, the camera is then correctly horizontally oriented.

As explained hereinbefore, the vanishing point is determined by searching for the point of convergence of the white lines on the image and by tracing a line passing through this point. In the preferred embodiment of the invention, the vanishing line is vertical. In other words, the line passing through the vanishing point is a vertical line. In this embodiment, the line passing through the middle of the image is also a vertical line.

These two lines may be displayed on a display screen. For improved display, these two lines may be two different colors. The user will then have to seek to draw these two lines together so that they become merged, by modifying the orientation of the camera. When these two lines are merged, the orientation of the camera is optimal.

The embodiment that has just been described is illustrated in FIG. 1A. More specifically, FIG. 1A shows an example of four parallel white lines on the ground: the inner two lines l1 and l2 are discontinuous lines and the outer two lines l3 and l4 are emergency stopping strips. The vanishing point is the point P of convergence of the lines l1 and l2. The vanishing line Lf is the vertical line passing through P. The line Lm is the middle line, also referred to simply as the middle, separating the image vertically into two portions of the same size. Until the lines Lf and Lm are merged, the orientation of the camera is not optimal. Angularly displacing the camera causes the vanishing line to be displaced, whereas the middle line remains identical. Thus, angularly displacing the camera allows the position of the vanishing line Lf relative to the middle line Lm to be varied.

This embodiment, in which the vanishing line is vertical, adjusts the camera horizontally, i.e. laterally in the plane of the road.

In another embodiment of the invention, the vanishing line of the image may be horizontal. In this case, the orientation of the camera is adjusted vertically in a plane perpendicular to the plane of the road. The pitch of the camera in the vehicle, i.e. the vertical inclination of the camera relative to the vehicle, is thus adjusted. In this case, the user must seek to match the horizontal vanishing line with a horizontal reference line in order to have an optimum vertical inclination of the camera. This embodiment is illustrated in FIG. 1B. More specifically FIG. 1B shows the same example of four parallel white lines on the ground as FIG. 1A. The vanishing line Hf is the horizontal line passing through the vanishing point P. The line Hm is the reference line separating the image horizontally into two portions, for example, of unequal height, in particular in a ratio of approximately ⅓, ⅔. Until the lines Hf and Hm are merged, the vertical orientation of the camera is not optimal. Angularly displacing the camera upward or downward allows the vertical position of the vanishing line f relative to the middle line Lm to be varied.

It will be understood that the camera can be adjusted both horizontally and vertically. When the horizontal orientation and vertical inclination are adjusted correctly, the camera is optimally oriented.

This embodiment with horizontal and vertical adjustment is preferably used in an application for detecting obstacles in which the evaluation of the distance is a crucial parameter for assessing the position of the obstacle relative to the vehicle.

The method of the invention is carried out by a system comprising the camera, the orientation of which is to be adjusted, an image processing unit and an interface between the processing unit and the user. FIG. 2 shows an example of a system of this type. More specifically FIG. 2 shows an example of a portion of a vehicle, in particular the windscreen behind which the camera to be adjusted is installed. In most applications using a camera, the camera is installed between the windscreen 7 and the central rear-view mirror 6 of the vehicle. It is therefore mounted substantially at the center of the vehicle. If the camera is installed at the center of the vehicle, its lateral, and optionally vertical, orientation may be adjusted by following the stages of the method of the invention.

In the example of FIG. 2, the camera 1 is oriented along the axis A. The camera 1 is equipped with a flange 5 provided with one or more ribs 8 preventing light rays from being reflected onto the camera. The camera 1 produces the images of the road scene—both those allowing the orientation of the camera to be adjusted and those allowing the detection of obstacles or white lines.

This system for adjusting the orientation of the camera also comprises an image processing unit 2. This processing unit 2 may be a processor integrated into the camera or else any other processor installed on board the vehicle and capable of processing images. If the processing unit 2 is not integrated into the camera 1, it is connected by a link 4 to the camera 1. This link may be a wired or radio link. The processing unit 2 detects the white lines in the image of the road scene, estimates the vanishing point and the vertical vanishing line, and estimates the middle of the image with the middle line in a vertical plane. As FIG. 2 shows, the vertical positioning of the vanishing point is not in the middle of the image. Instead, it is positioned in the first upper third in order to have maximum information in the image for tracing the vanishing lines.

The system of the invention also comprises an interface between the processing unit and the user. The purpose of this interface is to signal to the user how to modify the position of the camera 1 in order for the vanishing and middle lines to coincide. This interface is connected to the processing unit, for example by a wired link 4.

This interface may be a display screen 3, as shown in FIG. 2. This screen 3 displays the road scene and the vanishing point and middle lines in a vertical and positioning plane. The displayed image may, for example, be one of the images of FIGS. 1A and 1B. In this case, the user sees directly on the screen in which direction the camera must be displaced in order for the two lines to coincide. In order to provide easy adjustment, the displayed image is updated at regular intervals so that the user is able to follow, on the screen, the consequences of the displacement carried out. The user can see for himself when the orientation of the camera is correct.

In this embodiment, the display screen 3 may be a video compatible screen, such as a PDA screen, a screen of the vehicle navigation system, a DVD reader installed in the vehicle or any other screen such as the display screen associated with the obstacle detection system.

For applications not comprising a screen, and in order to avoid the excess cost of an additional screen, the interface may be a mere device for the sound or visual signalling of the direction of displacement. In this case, the interface advises the user, using perceptible signals, of the displacements to be carried out on the camera. This signalling device may be a visual assembly produced using light-emitting diodes. For example, a diode of a first color signals the displacement to be carried out toward the right and a second diode of a second color signals the displacement to be carried out on the left; when the two diodes are illuminated, the orientation is correct.

The signalling device may thus be produced using light arrows signalling the direction in which the camera must be displaced; when the two arrows are illuminated, the orientation is optimal.

The signalling device may also be a sound assembly which provides two differing sound signals, for example a first signal to indicate a displacement toward the right and a second signal to indicate a displacement toward the left; a third sound signal indicates to the user that the camera is correctly oriented. A sound signalling device of this type has the advantage of using the sound means of the white line monitoring system used to prevent the driver from crossing white lines.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for adjusting an orientation of a camera installed onboard a vehicle, comprising the following steps:
    installing the vehicle at a location provided with markings on the ground, said vehicle being positioned between said markings;
    detecting said markings;
    estimating a vanishing point based on said markings;
    a user estimating a middle of an image wherein said image comprises a middle line passing through said middle of the image wherein the user estimates the middle of the image by tracing said middle line;
    matching the vanishing point with a positioning point by angular displacement of said camera: and
    adjusting the orientation of said camera on the vehicle using said middle line that passes through said middle of said image.

2. The method according to claim 1, wherein said markings are parallel, said vanishing point is a point of convergence of the parallel markings on the image.

3. The method according to claim 2, wherein the estimating of the vanishing point step comprises the step of determining the location of said point of convergence and tracing a vanishing line passing through said point of convergence.

4. The method according to claim 3, wherein the line passing through the point of convergence and the middle of the image are not horizontal.

5. The method according to claim 3, wherein the lines passing through the point of convergence and the positioning point are not vertical.

6. The method according to claim 1, wherein the camera is displaced as a function of displacement information deduced from the position of the vanishing point relative to the middle in a vertical plane of the image and from the vertical position of the positioning point.

7. A system for adjusting the orientation of a camera using the method according to claim 1, which comprises:
    a camera capable of producing at least an image of said markings on the ground;
    a processing unit capable of detecting the markings on the image of estimating a vanishing point and of estimating the positioning point; and
    a user interface capable of providing the user with information on the displacement of said camera.

8. The system according to claim 7, wherein the interface comprises a screen displaying the image produced by the camera and also the vanishing and middle lines of the image.

9. The system according to claim 7, wherein the interface comprises a visual signalling device.

10. The system according to claim 9, wherein the visual signalling device comprises one or several light-emitting diodes signalling a direction of displacement.

11. The system according to claim 7, wherein the interface comprises a sound signalling device.

12. A motor vehicle, which comprises a system according to claim 7.

13. A method for adjusting an orientation of a camera mounted on a vehicle; said method comprising the steps of:
    determining a position of the camera relative to at least one target outside the vehicle;
    adjusting the orientation of the camera in response to said at least one target;
    a user estimating a middle of an image wherein said image comprises a middle line passing through said middle of the image wherein the user estimates the middle of the image by tracing said middle line; and
    adjusting the orientation of said camera on the vehicle using said middle line that passes through said middle of said image.

14. The method as recited in claim 13 wherein said at least one target comprises a plurality of markings on the ground; said determining step further comprising the step of:
    estimating a vanishing point using said plurality of markings;
    using said vanishing point during said adjusting step.

15. The method as recited in claim 14 wherein said method further comprises the step of:
    determining a positioning point for said camera;
    matching said positioning point with said vanishing point during said adjusting step.

16. The method as recited in claim 15 wherein said method further comprises the step of:
    performing said matching step by adjusting a position of said camera.

17. The method as recited in claim 15 wherein said method further comprises the step of:
    determining a point of convergence;
    using said point of convergence to determine said vanishing point;
    situating a point of convergence line on said point of convergence;
    situating an image line on said image;
    aligning said point of convergence line and said image line to perform said adjusting step.

18. The method as recited in claim 17 wherein said point of convergence line is at least one of a vertical line or a horizontal line.

19. The method as recited in claim 17 wherein said image line is a line situated at substantially a middle or midpoint between edges of an image captured by the camera.

20. The method as recited in claim 19 wherein each of said point of convergence line and said image line are the same.

21. The method as recited in claim 20 wherein each of said point of convergence line and said image line are at least one of a vertical line or a horizontal line.

* * * * *